United States Patent
Wang et al.

(10) Patent No.: US 12,439,035 B2
(45) Date of Patent: Oct. 7, 2025

(54) INTERPOLATION FILTERING METHOD AND APPARATUS FOR INTRA-FRAME PREDICTION, MEDIUM, AND ELECTRONIC DEVICE

(71) Applicant: TENCENT TECHNOLOGY (SHENZHEN) COMPANY LIMITED, Guangdong (CN)

(72) Inventors: Yingbin Wang, Shenzhen (CN); Yi Ming Li, Shenzhen (CN); Xiao Zhong Xu, State College, PA (US); Shan Liu, San Jose, CA (US); Zhenzhong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 268 days.

(21) Appl. No.: 17/492,925

(22) Filed: Oct. 4, 2021

(65) Prior Publication Data
US 2022/0030233 A1    Jan. 27, 2022

Related U.S. Application Data

(63) Continuation of application No. PCT/CN2020/122791, filed on Oct. 22, 2020.

(30) Foreign Application Priority Data

Nov. 15, 2019   (CN) .......................... 201911122284.0

(51) Int. Cl.
*H04N 19/117*   (2014.01)
*H04N 19/103*   (2014.01)
(Continued)

(52) U.S. Cl.
CPC .......... *H04N 19/117* (2014.11); *H04N 19/103* (2014.11); *H04N 19/105* (2014.11);
(Continued)

(58) Field of Classification Search
CPC ...... H04N 19/117; H04N 19/80; H04N 19/82; H04N 19/85; H04N 19/86; H04N 19/11; H04N 19/593; H04N 19/59; H04N 19/103
See application file for complete search history.

(56) References Cited

U.S. PATENT DOCUMENTS

2013/0128961 A1 *  5/2013  Kim ..................... H04N 19/82
                                                           375/240.03
2016/0198191 A1 *  7/2016  Lee ..................... H04N 19/157
                                                           375/240.12
(Continued)

FOREIGN PATENT DOCUMENTS

AU     2018276649 B2   12/2018
CN     108028923 A      5/2018
(Continued)

OTHER PUBLICATIONS

EPO, English-language machine translation of WO 2019088700 A1 (Year: 2023).*

(Continued)

*Primary Examiner* — David N Werner
(74) *Attorney, Agent, or Firm* — Sughrue Mion, PLLC

(57) ABSTRACT

The embodiments of the disclosure provide an interpolation filtering method and apparatus for intra-frame prediction, a medium, and an electronic device. According to a distance between a prediction pixel and a first reference pixel, a target filter matching the distance is selected from a filter parameter corresponding to a specified prediction unit, and interpolation filtering processing is performed on a second ref- (Continued)

erence pixel by using the target filter, to obtain a predicted value of the prediction pixel.

16 Claims, 7 Drawing Sheets

(51) Int. Cl.
*H04N 19/105* (2014.01)
*H04N 19/11* (2014.01)
*H04N 19/159* (2014.01)
*H04N 19/196* (2014.01)
*H04N 19/593* (2014.01)
*H04N 19/80* (2014.01)
*H04N 19/82* (2014.01)
*H04N 19/85* (2014.01)
*H04N 19/86* (2014.01)
*H04N 19/59* (2014.01)

(52) U.S. Cl.
CPC ........... *H04N 19/11* (2014.11); *H04N 19/159* (2014.11); *H04N 19/196* (2014.11); *H04N 19/593* (2014.11); *H04N 19/80* (2014.11); *H04N 19/82* (2014.11); *H04N 19/85* (2014.11); *H04N 19/86* (2014.11); *H04N 19/59* (2014.11)

(56) References Cited

U.S. PATENT DOCUMENTS

| | | | | |
|---|---|---|---|---|
| 2016/0373743 | A1* | 12/2016 | Zhao | H04N 19/174 |
| 2019/0204304 | A1* | 7/2019 | Shiba | G01N 33/5302 |
| 2019/0379906 | A1* | 12/2019 | Lee | H04N 19/157 |
| 2020/0007895 | A1* | 1/2020 | Van Der Auwera | H04N 19/105 |

FOREIGN PATENT DOCUMENTS

| | | | | |
|---|---|---|---|---|
| CN | 108702502 | A | 10/2018 | |
| CN | 108781285 | A * | 11/2018 | ............ H04N 19/80 |
| CN | 110166773 | A | 8/2019 | |
| CN | 110944211 | A | 3/2020 | |
| EP | 2560387 | A2 * | 2/2013 | ............... G06T 9/40 |
| WO | WO-2012044886 | A1 * | 4/2012 | ........... H04N 19/103 |
| WO | WO-2012078001 | A1 * | 6/2012 | ............... H04N 7/34 |
| WO | 2018/221817 | A1 | 12/2018 | |
| WO | 2019/088700 | A1 | 5/2019 | |

OTHER PUBLICATIONS

Y. Wang, X. Fan, D. Zhao, & W. Gao, "Mode Dependent Intra Smoothing Filter for HEVC", 2016 Proc. of IEEE Int'l Conf. on Image Processing (ICIP) 539-543 (Sep. 2016) (Year: 2016).*
First Office Action of Chinese Application No. 201911122284.0 dated Jul. 19, 2021.
International Search Report of PCT/CN2020/122791 dated Jan. 25, 2021 [PCT/ISA/210].
Written Opinion of PCT/CN2020/122791 dated Jan. 25, 2021 [PCT/ISA/237].
Extended European Search Report dated Jan. 23, 2023 in European Application No. 20887497.4.
Haoming Chen et al., "On Intra Prediction for Screen Content Video Coding", arXiv.org, https://doi.org/10.48550/arXiv.1511.01862, 2015, pp. 1-13 (14 pages total).
Akula et al., "Description of SDR, HDR and 360° video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/WG 11, JVET-J0024_v2, 10th Meeting: San Diego, US, Apr. 10-20, 2018, 119 pages total.
Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001_VE, 16th meeting: Geneva, CH, Oct. 1-11, 2019, pp. 1-489 (492 pages total).

* cited by examiner

INTERPOLATION FILTERING METHOD AND APPARATUS FOR INTRA-FRAME PREDICTION, MEDIUM, AND ELECTRONIC DEVICE

CROSS-REFERENCE TO RELATED APPLICATION(S)

This application is a continuation application of International Application No. PCT/CN2020/122791, filed Oct. 22, 2020, which claims priority to Chinese Patent Application No. 201911122284.0, filed with the China National Intellectual Property Administration on Nov. 15, 2019, the disclosures of which are incorporated by reference in their entireties.

FIELD

The disclosure relates to the field of computer and communication technologies, and in particular, to an interpolation filtering method and apparatus for intra-frame prediction, a medium, and an electronic device.

BACKGROUND

Intra-frame prediction interpolation filtering is to perform interpolation by using a spatial correlation of a pixel to obtain a pixel value of a sub-pixel location of a reference pixel, thereby obtaining a more accurate predicted value. In addition to an effect of linear interpolation, an intra-frame prediction sub-pixel interpolation filter also produces a smoothing effect, and smoothing can alleviate the impact of noise on intra-frame prediction, thereby facilitating concentration of energy after transformation and improving encoding efficiency.

However, the smoothing effect of the intra-frame prediction interpolation filter may result in loss of high-frequency texture detail information. In addition, an excessively smooth interpolation filter results in an excessively small difference between predicted values derived from adjacent prediction angles, affecting encoding performance gain. However, a sub-pixel filter in an audio video coding standard 3 (AVS 3) performs interpolation filtering on pixels in different locations in a prediction unit by using the same group of filter coefficients, and this manner may result in an inaccurate predicted value, affecting the encoding performance and the decoding efficiency.

SUMMARY

The embodiments of the disclosure provide an interpolation filtering method and apparatus for intra-frame prediction, a medium, and an electronic device, so that different interpolation filter parameters may be further adaptively selected according to location information of prediction pixels to some extent, thereby improving the accuracy of pixel interpolation prediction during intra-frame prediction and improving the encoding compression performance and the decoding efficiency.

Other features and advantages of the disclosure become obvious through the following detailed descriptions, or may be partially learned partially through the practice of the disclosure.

According to an aspect of the embodiments of the disclosure, an interpolation filtering method for intra-frame prediction is provided, including: obtaining information about a prediction pixel included in a specified prediction unit, and obtaining a filter parameter corresponding to the specified prediction unit; selecting, according to a distance between the prediction pixel and a first reference pixel of the prediction pixel, a target filter from the filter parameter corresponding to the specified prediction unit; and performing interpolation filtering processing on a second reference pixel by using the target filter, to obtain a predicted value of the prediction pixel.

According to an aspect of the embodiments of the disclosure, an interpolation filtering apparatus for intra-frame prediction is provided, including at least one memory configured to store program code; and at least one processor configured to read the program code and operate as instructed by the program code, the program code comprising: obtaining code configured to cause the at least one processor to obtain information about a prediction pixel included in a specified prediction unit, and obtain a filter parameter corresponding to the specified prediction unit; first processing code configured to cause the at least one processor to select, according to a distance between the prediction pixel and a first reference pixel of the prediction pixel, a target filter from the filter parameter corresponding to the specified prediction unit; and second processing code configured to cause the at least one processor to perform interpolation filtering processing on a second reference pixel of the prediction pixel by using the target filter, to obtain a predicted value of the prediction pixel.

According to an aspect of the embodiments of the disclosure, a non-transitory computer-readable medium is provided, storing a computer program, the computer program, when being executed by a processor, implementing the interpolation filtering method for intra-frame prediction according to the embodiments.

According to an aspect of the embodiments of the disclosure, an electronic device is provided, including: one or more processors; and a storage apparatus, configured to store one or more programs, the one or more programs, when being executed by the one or more processors, causing the electronic device to implement the interpolation filtering method for intra-frame prediction according to the embodiments.

BRIEF DESCRIPTION OF THE DRAWINGS

Accompanying drawings herein are incorporated into a specification and constitute a part of this specification, show embodiments that conform to the disclosure, and are used for describing example embodiments of the disclosure together with this specification. The accompanying drawings in the following descriptions are merely some embodiments of the disclosure, and a person of ordinary skill in the art may further obtain other accompanying drawings according to the accompanying drawings without creative efforts. In the accompanying drawings.

DETAILED DESCRIPTION

Example embodiments are described comprehensively with reference to the accompanying drawings. However, the example embodiments may be implemented in a plurality of forms, and the disclosure is not to be understood as being limited to the examples described herein. Conversely, the example embodiments are provided to make the disclosure more comprehensive and complete, and comprehensively convey the idea of the examples of the implementations to a person skilled in the art.

In addition, the described characteristics, structures, or features may be combined in one or more embodiments in any appropriate manner. In the following descriptions, a lot of specific details are provided to give a comprehensive understanding of the embodiments of the disclosure. However, it is to be appreciated by a person skilled in the art that the technical solutions in the disclosure may be implemented without one or more of the following particular details, or may be implemented by using another method, unit, apparatus, or step. In other cases, well-known of methods, apparatuses, implementations, or operations are not shown or described in detail, to avoid obscuring the aspects of the disclosure.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

Figure 1:
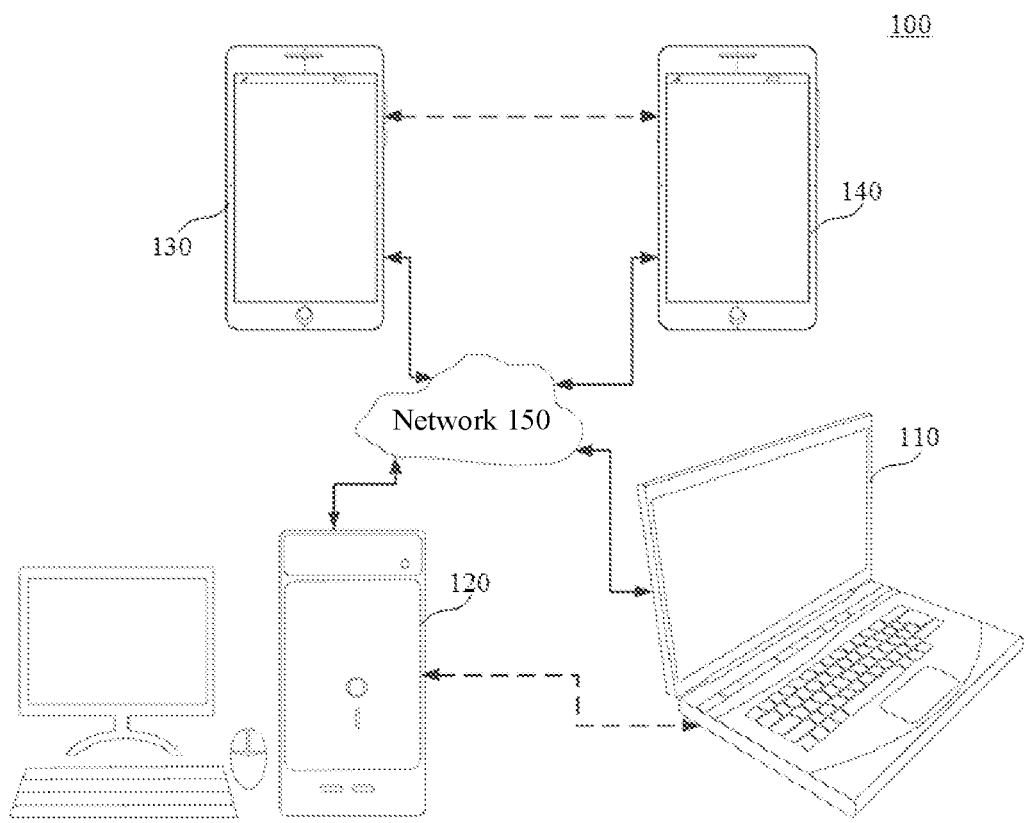
FIG. 1 is a schematic diagram of an exemplary system architecture to which a technical solution according to an embodiment of the disclosure is applicable.

FIG. 1 is a schematic diagram of an exemplary system architecture to which a technical solution according to an embodiment of the disclosure is applicable.

As shown in FIG. 1, a system architecture 100 includes a plurality of terminal devices, and the terminal devices may communicate with each other by using, for example, a network 150. For example, the system architecture 100 may include a first terminal device 110 and a second terminal device 120 that are interconnected by the network 150. In an embodiment of FIG. 1, the first terminal device 110 and the second terminal device 120 perform unidirectional data transmission. For example, the first terminal device 110 may encode video data (for example, a video picture stream acquired by the first terminal device 110) and transmit the encoded video data to the second terminal device 120 by using the network 150. The encoded video data is transmitted in the form of one or more encoded video bitstreams. The second terminal device 120 may receive the encoded video data from the network 150, decode the encoded video data to recover the video data, and display a video picture according to the recovered video data.

In an embodiment of the disclosure, the system architecture 100 may include a third terminal device 130 and a fourth terminal device 140 that perform bidirectional transmission of encoded video data, and the bidirectional transmission may occur, for example, during a video conference. For bidirectional data transmission, each of the third terminal device 130 and the fourth terminal device 140 may encode video data (for example, video picture streams acquired by the terminal devices), and transmit the encoded video data to the other of the third terminal device 130 and the fourth terminal device 140 by using the network 150. Each of the third terminal device 130 and the fourth terminal device 140 may further receive the encoded video data transmitted by the other of the third terminal device 130 and the fourth terminal device 140, decode the encoded video data to recover the video data, and display a video picture on an accessible display apparatus according to the recovered video data.

In the embodiment of FIG. 1, the first terminal device 110, the second terminal device 120, the third terminal device 130, and the fourth terminal device 140 may be servers, personal computers, and smartphones. However, the principles disclosed in the disclosure may not be limited thereto. The embodiments disclosed in the disclosure are applicable to a laptop computer, a tablet computer, a media player, and/or a dedicated video conference device. The network 150 represents any quantity of networks for transmitting the encoded video data among the first terminal device 110, the second terminal device 120, the third terminal device 130, and the fourth terminal device 140, including, for example, a wired and/or wireless communication network. The communication network 150 may exchange data in a circuit switched and/or packet switched channel. The network may include a telecommunication network, a local area network, a wide area network, and/or Internet. For purposes of the disclosure, the architecture and topology of the network 150 may be inconsequential to the operations disclosed in the disclosure, except as explained below.

Figure 2:
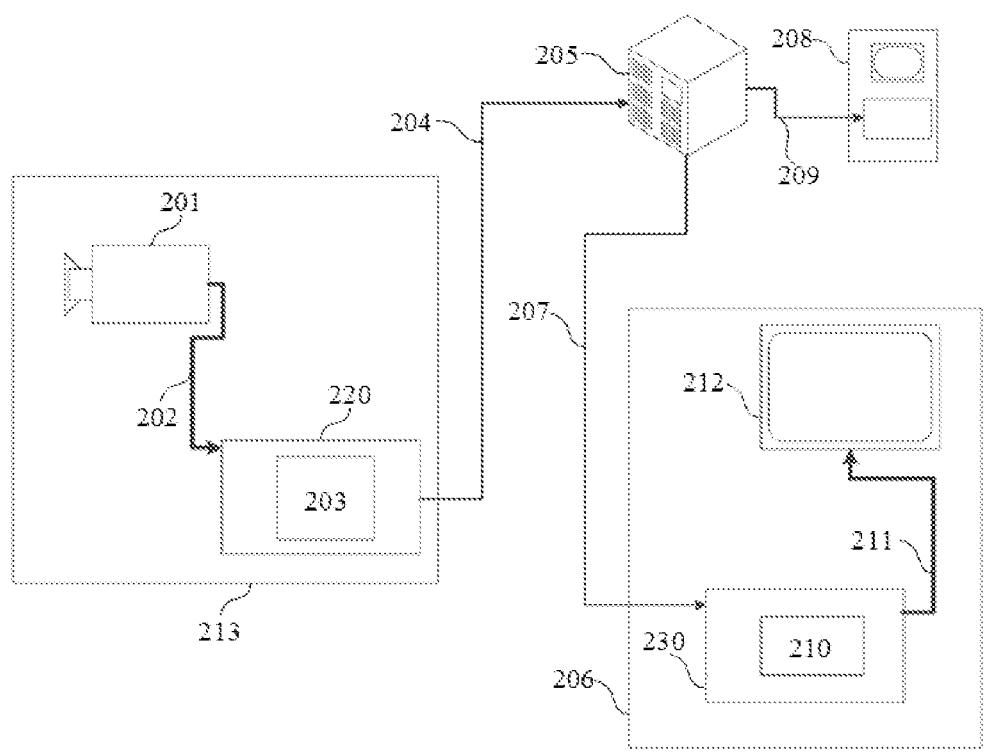
FIG. 2 is a schematic diagram of placement manners of a video encoding apparatus and a video decoding apparatus in a streaming transmission environment according to an embodiment of the disclosure.

FIG. 2 is a schematic diagram of placement manners of a video encoding apparatus and a video decoding apparatus in a streaming transmission environment according to an embodiment of the disclosure. A subject disclosed in the disclosure is equally applicable to another application that supports a video, including, for example, a video conference, a digital TV, storage of a compressed video on digital media including such as a CD, a DVD, and a memory stick.

A streaming transmission system may include an acquisition subsystem 213, the acquisition subsystem 213 may include a video source 201 such as a digital camera, and the video source 201 creates an uncompressed video picture stream 202. In this embodiment, the video picture stream 202 includes a sample shot by the digital camera. Compared with encoded video data 204 (or an encoded video bitstream 204), the video picture stream 202 is represented as a thick line in FIG. 2 to emphasize a high data volume video picture stream. The video picture stream 202 may be processed by an electronic device 220, and the electronic device 220 includes a video encoding apparatus 203 coupled to the video source 201. The video encoding apparatus 203 may include a hardware, software, or a combination of software and hardware to implement the aspects according to example embodiments described in more detail below. Compared with the video picture stream 202, the encoded video data 204 (or the encoded video bitstream 204) is represented as a thin line to emphasize relatively low data volume encoded video data 204 (or encoded video bitstream 204), which may be stored in a streaming transmission server 205 for use in future. One or more streaming transmission client subsystems, for example, a client subsystem 206 and a client subsystem 208 shown in FIG. 2 may access the streaming transmission server 205 to retrieve a duplication 207 and a duplication 209 of the encoded video data 204. The client subsystem 206 may include, for example, a video decoding apparatus 210 in an electronic device 230. The video decoding apparatus 210 decodes the transmitted duplication 207 of the encoded video data, and generates an output video picture stream 211 that may be displayed on a display 212 (for example, a display screen) or another display apparatus. In some streaming transmission systems, the encoded video data 204, the video data 207, and the video data 209 (for example, a video bitstream) may be encoded according to some video encoding/compression standards. An embodiment of the standards includes ITU-T H.265. In an embodiment, a video encoding standard that is being developed is informally referred to as a next-generation video encoding standard (that is, versatile video coding (VVC)). In the disclosure, the VVC standard is applicable to the context.

The electronic device 220 and the electronic device 230 may include another component not shown in the figure. For example, the electronic device 220 may include a video decoding apparatus, and the electronic device 230 may further include a video encoding apparatus.

The implementation of the technical solutions in the embodiments of the disclosure are described below in detail.

Figure 3:
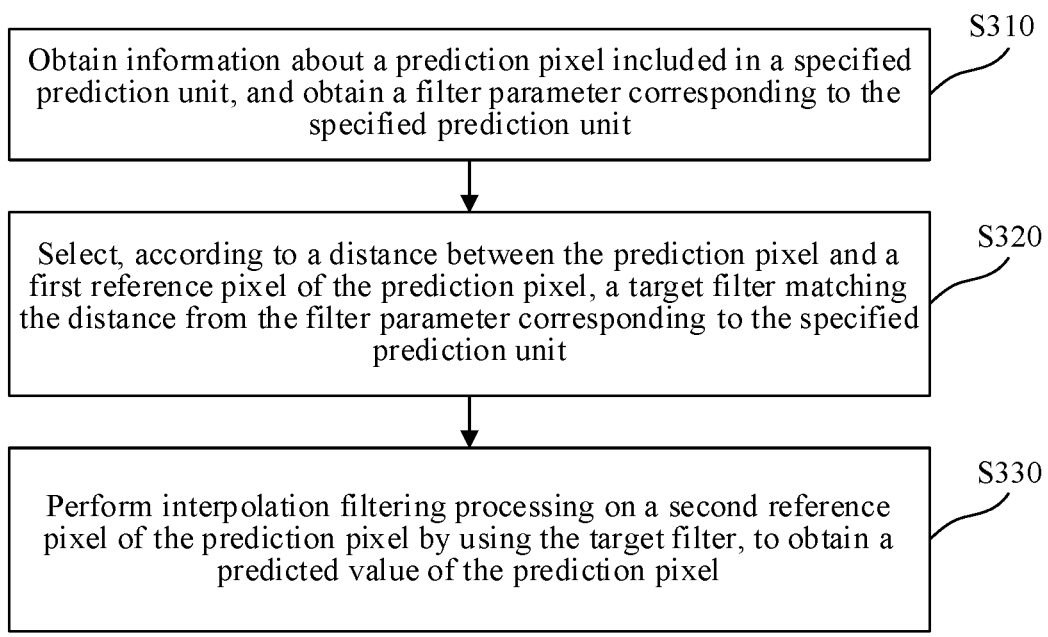
FIG. 3 is a flowchart of an interpolation filtering method for intra-frame prediction according to an embodiment of the disclosure.

FIG. 3 is a flowchart of an interpolation filtering method for intra-frame prediction according to an embodiment of the disclosure. The interpolation filtering method for intra-frame prediction may be performed by the video encoding apparatus and/or the video decoding apparatus according to the foregoing embodiments. Referring to FIG. 3, the interpolation filtering method for intra-frame prediction includes at least operation S310 to operation S330. A detailed description is as follows.

Operation S310. Obtain information about a prediction pixel included in a specified prediction unit, and obtain a filter parameter corresponding to the specified prediction unit.

In an embodiment of the disclosure, the specified prediction unit may be any prediction unit included in a video frame. The prediction unit may be a prediction block, an encoding unit, or a two-dimensional pixel block. The filter parameter may include a filter, a distance threshold (the distance threshold is used for classifying prediction pixels included in the specified prediction unit), and the like. A parameter of the filter may include: one or more of smoothing strength, a quantity of taps, sub-pixel location precision, and filtering coefficient precision, and parameters of different filters are not identical.

In an embodiment of the disclosure, prediction units included in the video frame may be classified into at least one category according to information about the prediction units included in the video frame, each category of prediction units corresponding to a group of filter parameters. In this way, the filter parameter corresponding to each category of prediction units may be set according to the information (for example, a size and a prediction mode) about the prediction units, thereby improving the accuracy of intra-frame prediction and improving the encoding compression performance and the decoding efficiency. In this case, a category to which the specified prediction unit belongs may be first determined, and then a filter parameter corresponding to the category to which the specified prediction unit belongs is used as the filter parameter corresponding to the specified prediction unit; or a part of a filter parameter corresponding to the category to which the specified prediction unit belongs is selected as the filter parameter corresponding to the specified prediction unit.

In an embodiment of the disclosure, when classification is performed on the prediction units included in the video frame, the prediction units included in the video frame may be classified into the at least one category according to sizes of the prediction units included in the video frame. For example, at least one size range may be set, and then the prediction units included in the video frame are classified into a category corresponding to the at least one set size range according to the sizes of the prediction units included in the video frame. The size of the prediction unit may be a product of a width and a height of the prediction unit, or may be a sum of a width and a height of the prediction unit, or may be a width of the prediction unit or a height of the prediction unit, or the like.

In an embodiment of the disclosure, when classification is performed on the prediction units included in the video frame, the prediction units included in the video frame may be classified into the at least one category according to intra-frame prediction modes used by the prediction units included in the video frame. For example, a prediction unit that adopts a vertically downward intra-frame prediction mode may be classified into one category, and a prediction unit that adopts a horizontal-left intra-frame prediction mode is classified into one category.

In an embodiment of the disclosure, when classification is performed on the prediction units included in the video frame, the prediction units included in the video frame may be classified into the at least one category according to features of reference pixels adjacent to the prediction units included in the video frame. For example, a statistical feature of a plurality of reference pixels may be calculated according to the plurality of reference pixels adjacent to the prediction units, and then the prediction units included in the video frame are classified into the at least one category according to the statistical feature of the plurality of reference pixels.

In an embodiment of the disclosure, the plurality of reference pixels may include reference pixels located on the top of the prediction units in a pixel coordinate system, or may include reference pixels located on the left of the prediction units in a pixel coordinate system, or may include reference pixels located on the top and the left of the prediction units in a pixel coordinate system.

In an embodiment of the disclosure, the statistical feature of the plurality of reference pixels includes, for example, any one of the following: a variance of gradient values of the plurality of reference pixels, a maximum gradient value in the plurality of reference pixel, an average gradient value of the plurality of reference pixels, a variance of pixel values of the plurality of reference pixels, and a difference between a maximum pixel value and a minimum pixel value in the plurality of reference pixels.

Still referring to FIG. 3, operation S320. Select, according to a distance between the prediction pixel and a first reference pixel of the prediction pixel, a target filter matching the distance from the filter parameter corresponding to the specified prediction unit.

In an embodiment of the disclosure, first reference pixels of different prediction pixels in the same prediction unit may be the same or may be different. For example, the first reference pixel of the prediction pixel may be a reconstructed pixel adjacent to the specified prediction unit, or may be a pixel adjacent to the specified prediction unit and located on the upper left of the specified prediction unit, or may be a pixel selected from adjacent pixels of the prediction pixels according to an angular prediction mode used by the specified prediction unit; or the first pixel at an upper left corner of the prediction unit is used as the first reference pixel of the prediction pixel in the prediction unit. During encoding, the reconstructed pixel is an encoded pixel; and during decoding, the reconstructed pixel is a decoded pixel.

Figure 4:
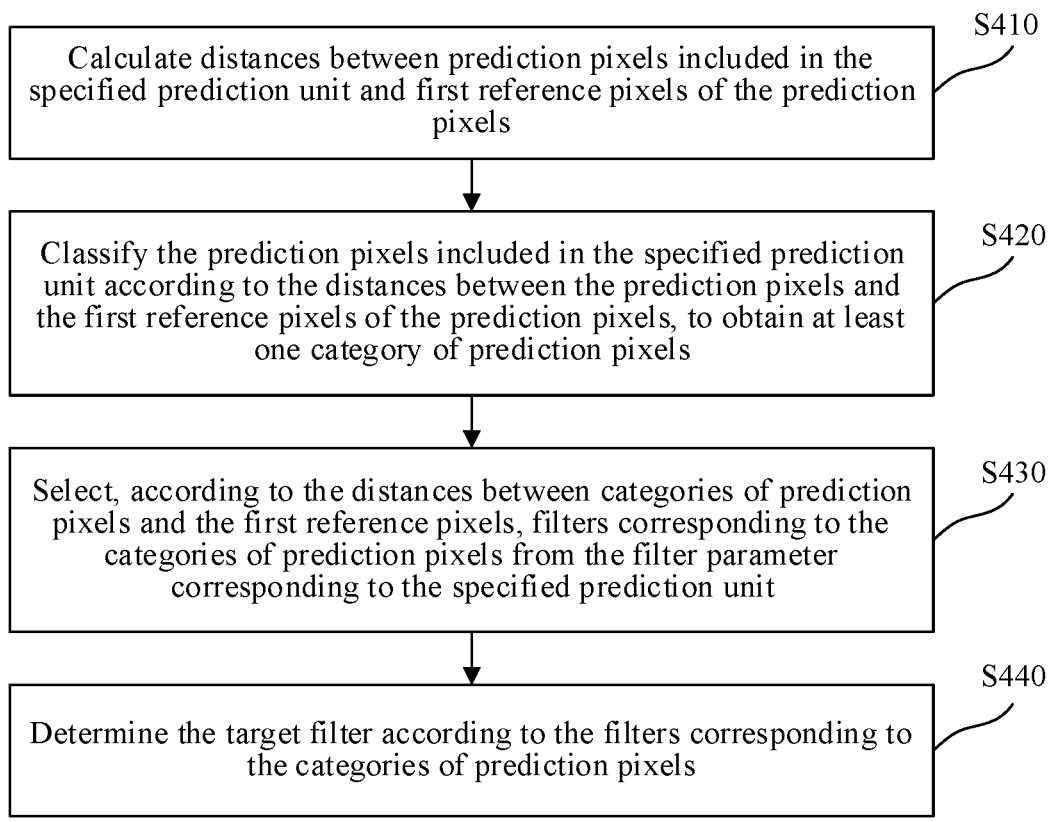
FIG. 4 is a process flowchart of operation S320 shown in FIG. 3 according to an embodiment of the disclosure.

FIG. 4 is a process flowchart of operation S320 shown in FIG. 3 according to an embodiment of the disclosure. In an embodiment of the disclosure, as shown in FIG. 4, a process of selecting a target filter matching the distance from the filter parameter corresponding to the specified prediction unit in operation S320 shown in FIG. 3 may include operation S410 to operation S440. A detailed description is as follows.

Operation S410. Calculate distances between prediction pixels included in the specified prediction unit and first reference pixels of the prediction pixels.

In an embodiment of the disclosure, distances between prediction pixels and first reference pixels may be calculated in various manners, examples of which are described respectively below.

In an embodiment of the disclosure, Euclidean distances between the prediction pixels and the first reference pixels of the prediction pixels may be calculated, and then the Euclidean distances are used as the distances between the prediction pixels and the first reference pixels of the prediction pixels. For example, if in a pixel coordinate system, coordinates of a prediction pixel are $(x_0, y_0)$, and coordinates of a first reference pixel of the prediction pixel are $(x_1, y_1)$, a distance between the prediction pixel $(x_0, y_0)$ and the first reference pixel $(x_1, y_1)$ may be calculated by using a formula $\sqrt{(x_0-x_1)^2+(y_0-y_1)^2}$.

In an embodiment of the disclosure, absolute values of abscissa differences between the prediction pixels and the first reference pixels of the prediction pixels and absolute values of ordinate differences between the prediction pixels and the first reference pixels of the prediction pixels may be calculated, and sums of the absolute values of the abscissa differences and the absolute values of the ordinate differences are used as the distances between the prediction pixels and the first reference pixels of the prediction pixels. For example, if in the pixel coordinate system, coordinates of a prediction pixel are $(x_0, y_0)$, and coordinates of a first reference pixel of the prediction pixel are $(x_1, y_1)$, a distance between the prediction pixel $(x_0, y_0)$ and the first reference pixel $(x_1, y_1)$, may be calculated by using a formula $|(x_0-x_1|+|y_0-y_1|$.

In an embodiment of the disclosure, absolute values of abscissa differences between the prediction pixels and the first reference pixels of the prediction pixels and absolute values of ordinate differences between the prediction pixels and the first reference pixels of the prediction pixels may be calculated, and then a minimum value or a maximum value in the absolute values of the abscissa differences and a minimum value or a maximum value in the absolute values of the ordinate differences are used as the distances between the prediction pixels and the first reference pixels of the prediction pixels. For example, if in the pixel coordinate system, coordinates of a prediction pixel are $(x_0, y_0)$, and coordinates of a first reference pixel of the prediction pixel are $(x_1, y_1)$, a distance between the prediction pixel $(x_0, y_0)$ and the first reference pixel $(x_1, y_1)$ may be calculated by using a formula $\min(|x_0-x_1|,|y_0-y_1|)$ or $\max(|x_0-x_1|,|y_0-y_1|)$.

In an embodiment of the disclosure, absolute values of abscissa differences between the prediction pixels and the first reference pixels of the prediction pixels may be calculated, and then the absolute values of the abscissa differences are used as the distances between the prediction pixels and the first reference pixels of the prediction pixels. For example, if in the pixel coordinate system, coordinates of a prediction pixel are $(x_0, y_0)$, and coordinates of a first reference pixel of the prediction pixel are $(x_1, y_1)$, a distance between the prediction pixel $(x_0, y_0)$ and the first reference pixel $(x_1, y_1)$ may be calculated by using a formula $|x_0-x_1|$. For example, when the first reference pixel is located on the front left of the prediction unit (for example, a prediction mode deviated toward a horizontal direction is adopted), the distance between the prediction pixel $(x_0, y_0)$ and the first reference pixel $(x_1, y_1)$ may be calculated by using the formula $|x_0-x_1|$.

In an embodiment of the disclosure, absolute values of ordinate differences between the prediction pixels and the first reference pixels of the prediction pixels may be calculated, and then the absolute values of the ordinate differences are used as the distances between the prediction pixels and the first reference pixels of the prediction pixels For example, if in the pixel coordinate system, coordinates of a prediction pixel are $(x_0, y_0)$, and coordinates of a first reference pixel of the prediction pixel are $(x_1, y_1)$, a distance between the prediction pixel $(x_0, y_0)$ and the first reference pixel $(x_1, y_1)$ may be calculated by using a formula $|y_0-y_1|$. For example, when the first reference pixel is located right above the prediction unit (for example, a prediction mode deviated toward a vertical direction is adopted), the distance between the prediction pixel $(x_0, y_0)$ and the first reference pixel $(x_1, y_1)$ may be calculated by using the formula $|y_0-y_1|$.

Still referring to FIG. 4, operation S420. Classify the prediction pixels included in the specified prediction unit according to the distances between the prediction pixels and the first reference pixels of the prediction pixels, to obtain at least one category of prediction pixels.

In an embodiment of the disclosure, the prediction pixels included in the specified prediction unit may be classified based on a set distance range and according to the distances between the prediction pixels and the first reference pixels of the prediction pixels.

In an embodiment of the disclosure, the filter parameter corresponding to the specified prediction unit may include at least one distance threshold corresponding to the specified prediction unit. Subsequently, at least one distance range may be obtained according to the at least one distance threshold, and then the prediction pixels included in the specified prediction unit may be classified based on the at least one distance range and according to the distances between the prediction pixels and the first reference pixels of the prediction pixels.

Operation S430. Select, according to the distances between categories of prediction pixels and the first reference pixels, filters corresponding to the categories of prediction pixels from the filter parameter corresponding to the specified prediction unit.

In an embodiment of the disclosure, filters corresponding to categories of prediction pixels may be selected from the filter parameter corresponding to the specified prediction unit based on a positive correlation relationship between a distance and a smoothing degree of a filter. That is, if a distance between a prediction pixel and a first reference pixel is smaller, a filter with a relatively low smoothing degree is selected; and if the distance between the prediction pixel and the first reference pixel is larger, a filter with a relatively high smoothing degree is selected.

In an embodiment of the disclosure, the filters corresponding to the categories of prediction pixels may be selected from the filter parameter corresponding to the specified prediction unit based on a positive correlation relationship between a distance and a quantity of taps included in a filter. That is, if a distance between a prediction pixel and a first reference pixel is smaller, a filter with a relatively small quantity of taps is selected; and if the distance between the prediction pixel and the first reference pixel is larger, a filter with a relatively large quantity of taps is selected.

Still referring to FIG. 4, operation S440. Determine the target filter according to the filters corresponding to the categories of prediction pixels.

In an embodiment of the disclosure, a category to which a prediction pixel belongs needs to be determined, and a filter corresponding to the category may be used as a target filter; or a part of a filter corresponding to the category may be selected as the target filter.

Still referring to FIG. 3, operation S330. Perform interpolation filtering processing on a second reference pixel of the prediction pixel by using the target filter, to obtain a predicted value of the prediction pixel.

In an embodiment of the disclosure, a second reference pixel of the prediction pixel and the first reference pixel of the prediction pixel may be the same pixel or may be different pixels.

In an embodiment of the disclosure, after obtaining a predicted value of the prediction pixel, an encoder side may further encode the prediction pixel according to the predicted value of the prediction pixel; and after obtaining a predicted value of the prediction pixel, a decoder side may decode the prediction pixel based on the predicted value of the prediction pixel.

In the technical solution of the embodiment shown in FIG. 3, different interpolation filters may be adaptively selected according to location information of prediction pixels, thereby improving the accuracy of pixel interpolation prediction during intra-frame prediction and improving the encoding compression performance and the decoding efficiency.

The technical solution of this embodiment of the disclosure is applicable to the field of audio and video encoding technologies. Specifically, more than one group of sub-pixel interpolation filter coefficients may be predefined. For a pixel value in each prediction unit, a filter coefficient group is selected according to a location of a to-be-predicted pixel and a size of a prediction unit in which the to-be-predicted pixel is located, and finally interpolation filtering is performed on a reference pixel to obtain a predicted value of the prediction pixel. The implementation of the embodiments of the disclosure is described below in detail.

In an embodiment of the disclosure, K (K>1) interpolation filters $F_{all}=\{f_1, f_2, \ldots, f_k\}$ may be predefined, and information about different filters is not identical. Specifically, one or more of smooth filter strength, quantities of taps, sub-pixel location precision, and filter coefficient precision of different filters are not identical. For example, all the quantities of taps of different filters may be n, or the quantities of taps of different filters are different. In another example, all the sub-pixel location precision of different filters may be 32, or all the coefficient precision of different filters may be 128.

In an embodiment of the disclosure, each prediction unit may have a group of corresponding filter parameters {F,TD}, and the filter parameter may include a filter bank $F=\{f_1, f_2, \ldots, f_{m+1}\}$ and a distance threshold $TD=\{td_1, td_2, \ldots, td_m\}$, m being a quantity of distance thresholds. When filter parameters of prediction units are determined, the prediction units may be first classified. Subsequently, a filter parameter group corresponding to each category of prediction units is determined, and then the filter parameters of the prediction units may be obtained.

In an embodiment of the disclosure, when classification is performed on the prediction units, there may be the following classification manners:

For example, classification is performed according to sizes of the prediction units.

In an embodiment of the disclosure, size thresholds $TS=\{ts_1, ts_2, \ldots, ts_n\}$, sorted in ascending order are set, prediction units are classified into a plurality of categories $\{S_1, S_2, \ldots, S_{n+1}\}$ according to sizes of the prediction units in which prediction pixels are located, a size of a prediction unit belonging to a category $S_x$ being greater than $ts_{x-1}$ and less than or equal to $ts_x$, that is, a smaller x indicates a smaller size of the prediction unit belonging to the $S_x$, and corresponding filter parameters $\{F_x, TD_x\}$ are specified for different categories of prediction units.

In an embodiment of the disclosure, a size of a prediction unit may be a product of a width and a height of prediction unit, or may be a sum of a width and a height of the prediction unit, or may be a width of the prediction unit, or may be a height of the prediction unit.

In an example, a size threshold $ts_1=256$, a prediction unit of which an area is greater than or equal to 256 and a prediction unit of which an area is less than 256 are respectively classified into one category, and corresponding filter parameters are $\{F_1, TD_1\}$ and $\{F_2, TD_2\}$ respectively, filter parameters $F_x$ and $TD_x$ of different categories may include the same element or different elements, that is, $F_1$ and $F_2$ as well as $TD_1$ and $TD_2$ may be the same or may be different.

In another example, classification is performed according to intra-frame prediction modes of the prediction units.

In an embodiment of the disclosure, different filter parameters $\{F_x, TD_x\}$ may be used for prediction units that adopt different intra-frame prediction modes.

Figure 5:
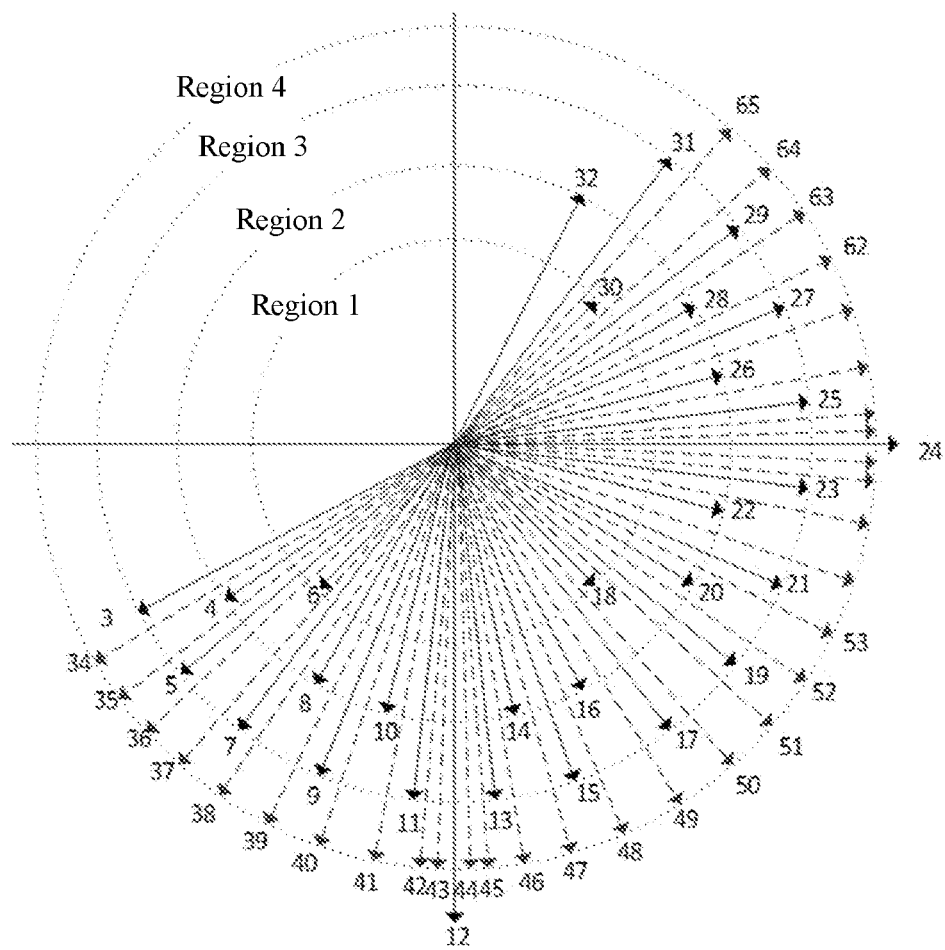
FIG. 5 is a schematic distribution diagram of intra-frame prediction modes according to an embodiment of the disclosure.

For example, prediction units that adopt vertically downward and adjacent prediction modes may be classified into one category, and prediction units that adopt horizontal-left and adjacent prediction modes are classified into another category. FIG. 5 is a schematic distribution diagram of intra-frame prediction modes according to an embodiment of the disclosure. In an intra-frame prediction mode shown in FIG. 5, prediction units that adopt intra-frame prediction mode numbers {18-32, 51-65} may be classified into one category, and other prediction units are classified into another category. Corresponding filter parameters are $\{F_1, TD_1\}$ and $\{F_2, TD_2\}$ respectively, filter parameters $F_x$ and $TD_x$ of different categories may include the same element or different elements, that is, $F_1$ and $F_2$ as well as $TD_1$ and $TD_2$ may be the same or may be different.

In another example, classification is performed according to a statistical feature of reference pixels.

In an embodiment of the disclosure, statistical analysis may be performed by using encoded (or decoded) reference pixels around the prediction units, and the prediction units are classified according to a statistical feature, different categories corresponding to different filter parameters $\{F_x, TD_x\}$.

In an embodiment of the disclosure, the encoded (or decoded) reference pixels around the prediction units may be reference pixels on the top of the prediction units, or may be reference pixels on the left of the prediction units, or may be reference pixels on the top and left of the prediction units.

In an embodiment of the disclosure, the statistical feature of the reference pixels may be a variance of gradient values of the reference pixels, a maximum gradient value in the reference pixels, or an average gradient value of the reference pixels; or the statistical feature of the reference pixels may be a variance of pixel values of the reference pixels, or a difference between a maximum pixel value and a minimum pixel value in the reference pixels, or the like.

When classification is performed on prediction units, and after filter parameters corresponding to categories of prediction units are determined, prediction pixels may be classified based on distances, and then different filters are selected for interpolation filtering processing for different prediction pixels.

In an embodiment of the disclosure, it is assumed that in a pixel coordinate system, coordinates of a prediction pixel are $(x_0, y_0)$, coordinates of a reference pixel are $(x_1, y_1)$, and coordinates of the first pixel at an upper left corner of a prediction unit are $(x_2, y_2)$. Distance thresholds TD in the filter parameter are sorted in ascending order as $\{td_1, td_2, \ldots, td_m\}$, prediction pixels are classified into a plurality of categories $\{D_1, D_2, \ldots, D_{m+1}\}$ according to distances between the prediction pixels and the reference pixels, a distance between a prediction pixel belonging to a category $D_x$ and a reference pixel being greater than $td_{x-1}$ and less than or equal to $td_x$, that is, a smaller x indicates a closer distance between the prediction pixel belonging to the $D_x$ and the reference pixel.

In an embodiment of the disclosure, a filter with a relatively low smooth degree may be used for a prediction pixel relatively close to a reference pixel, and a filter with a relatively high smooth degree may be used for a prediction pixel relatively far away from a reference pixel.

In an embodiment of the disclosure, a filter with a relatively small quantity of taps may be used for a prediction pixel relatively close to a reference pixel; and a filter with a relatively large quantity of taps may be used for a prediction pixel relatively far away from a reference pixel.

In an example, a filter parameter of a prediction unit is $\{F=\{f_1,f_2,f_3\}, TD=\{td_1=1, td_2=2\}\}$, if reference pixels of all prediction pixels in the prediction unit are all on the top of the prediction unit, and distances between the prediction pixels and the reference pixels are calculated according to a formula $|y_0-y_1|$, a first row of prediction pixels, a second row of prediction pixel, and another row of prediction pixels in the prediction unit may be classified into categories $\{D_1, D_2, D_3\}$, and interpolation filtering is performed on a prediction pixel belonging to a category $D_x$ by using a corresponding filter $f_x$, to generate a predicted value.

In the technical solution of the embodiments of the disclosure, different sub-pixel interpolation filters may be adaptively selected according to sizes, prediction modes, or the like of prediction units and location information of to-be-predicted pixels, thereby improving the accuracy of pixel interpolation prediction during intra-frame prediction and improving the compression performance and the decoding efficiency.

The following describes apparatus embodiments of the disclosure, and the apparatus embodiments may be used for performing the interpolation filtering method for intra-frame prediction in the foregoing embodiments of the disclosure. For details not disclosed in the apparatus embodiments of the disclosure, reference is made to the embodiments of the interpolation filtering method for intra-frame prediction in the disclosure.

Figure 6:
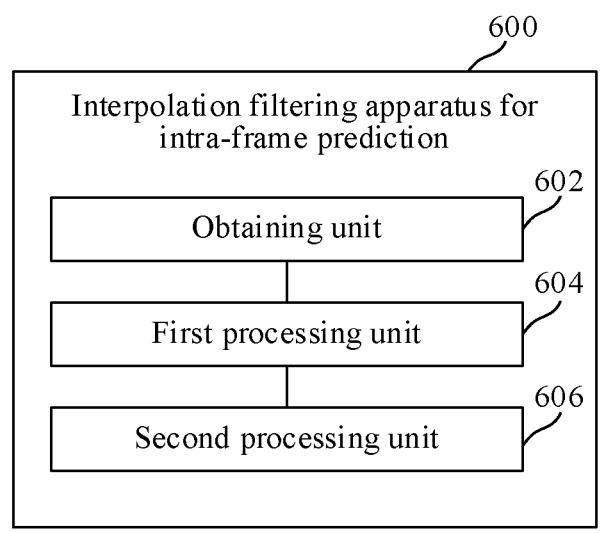
FIG. 6 is a block diagram of an interpolation filtering apparatus for intra-frame prediction according to an embodiment of the disclosure.

FIG. 6 is a block diagram of an interpolation filtering apparatus for intra-frame prediction according to an embodiment of the disclosure.

Referring to FIG. 6, an interpolation filtering apparatus 600 for intra-frame prediction according to an embodiment of the disclosure includes: an obtaining unit 602, a first processing unit 604, and a second processing unit 606.

The obtaining unit 602 is configured to obtain information about a prediction pixel included in a specified prediction unit, and obtain a filter parameter corresponding to the specified prediction unit; the first processing unit 604 is configured to select, according to a distance between the prediction pixel and a first reference pixel of the prediction pixel, a target filter matching the distance from the filter parameter corresponding to the specified prediction unit; and the second processing unit 606 is configured to perform interpolation filtering processing on a second reference pixel of the prediction pixel by using the target filter, to obtain a predicted value of the prediction pixel.

In some embodiments of the disclosure, based on the foregoing solutions, the interpolation filtering apparatus 600 further includes a classification unit, configured to classify, according to information about prediction units included in a video frame, the prediction units included in the video frame into at least one category, each category of prediction units corresponding to a group of filter parameters; and the obtaining unit 602 is configured to determine the filter parameter corresponding to the specified prediction unit according to a filter parameter corresponding to a category to which the specified prediction unit belongs.

In some embodiments of the disclosure, based on the foregoing solutions, the classification unit is configured to classify the prediction units included in the video frame into the at least one category according to sizes of the prediction units included in the video frame; or classify the prediction units included in the video frame into the at least one category according to intra-frame prediction modes used by the prediction units included in the video frame; or classify the prediction units included in the video frame into the at least one category according to features of reference pixels adjacent to the prediction units included in the video frame.

In some embodiments of the disclosure, based on the foregoing solutions, the classifying, by the classification unit, the prediction units included in the video frame into the at least one category according to sizes of the prediction units included in the video frame includes: classifying the prediction units included in the video frame into a category corresponding to at least one set size range according to the sizes of the prediction units included in the video frame, the size of the prediction unit including any one of the following: a product of a width and a height of the prediction unit, a sum of a width and a height of the prediction unit, a width of the prediction unit, and a height of the prediction unit.

In some embodiments of the disclosure, based on the foregoing embodiments, the classifying, by the classification unit, the prediction units included in the video frame into the at least one category according to features of reference pixels adjacent to the prediction units included in the video frame includes: calculating, according to a plurality of reference pixels adjacent to the prediction units, a statistical feature of the plurality of reference pixels; and classifying the prediction units included in the video frame into the at least one category according to the statistical feature of the plurality of reference pixels.

In some embodiments of the disclosure, based on the foregoing embodiments, the plurality of reference pixels include at least one of the following: reference pixels located on the top of the prediction units in a pixel coordinate system and reference pixels located on the left of the prediction units in the pixel coordinate system.

In some embodiments of the disclosure, based on the foregoing embodiments, the statistical feature of the plurality of reference pixels includes any one of the following: a variance of gradient values of the plurality of reference pixels, a maximum gradient value in the plurality of reference pixel, an average gradient value of the plurality of reference pixels, a variance of pixel values of the plurality of reference pixels, and a difference between a maximum pixel value and a minimum pixel value in the plurality of reference pixels.

In some embodiments of the disclosure, based on the foregoing solutions, the first processing unit 604 includes: a calculation unit, configured to calculate distances between prediction pixels included in the specified prediction unit and first reference pixels of the prediction pixels; a classification unit, configured to classify the prediction pixels included in the specified prediction unit according to the distances between the prediction pixels and the first reference pixels of the prediction pixels, to obtain at least one category of prediction pixels; a selecting unit, configured to select, according to the distances between categories of prediction pixels and the first reference pixels, filters corresponding to the categories of prediction pixels from the filter parameter corresponding to the specified prediction unit; and a determining unit, configured to determine the target filter according to the filters corresponding to the categories of prediction pixels.

In some embodiments of the disclosure, based on the foregoing solutions, the filter parameter corresponding to the specified prediction unit includes at least one distance threshold corresponding to the specified prediction unit; and the classification unit is configured to classify the prediction pixels included in the specified prediction unit based on the distances between the prediction pixels and the first reference pixels of the prediction pixels and the at least one distance threshold.

In some embodiments of the disclosure, based on the foregoing solutions, the calculation unit is configured to calculate the distances between the prediction pixels included in the specified prediction unit and the first reference pixels of the prediction pixels in any manner of the following:

calculating Euclidean distances between the prediction pixels and the first reference pixels of the prediction pixels, and using the Euclidean distances as the distances between the prediction pixels and the first reference pixels of the prediction pixels;

calculating absolute values of abscissa differences between the prediction pixels and the first reference pixels of the prediction pixels and absolute values of ordinate differences between the prediction pixels and the first reference pixels of the prediction pixels, and using sums of the absolute values of the abscissa differences and the absolute values of the ordinate differences as the distances between the prediction pixels and the first reference pixels of the prediction pixels;

calculating the absolute values of the abscissa differences of the prediction pixels and the first reference pixels of the prediction pixels and the absolute values of the ordinate differences of the prediction pixels and the first reference pixels of the prediction pixels, and using a minimum value or a maximum value in the absolute values of the abscissa differences and a minimum value or a maximum value in the absolute values of the ordinate differences as the distances between the prediction pixels and the first reference pixels of the prediction pixels;

calculating the absolute values of the abscissa differences of the prediction pixels and the first reference pixels of the prediction pixels, and using the absolute values of the abscissa differences as the distances between the prediction pixels and the first reference pixels of the prediction pixels; and calculating the absolute values of the ordinate differences of the prediction pixels and the first reference pixels of the prediction pixels, and using the absolute values of the ordinate differences as the distances between the prediction pixels and the first reference pixels of the prediction pixels.

In some embodiments of the disclosure, based on the foregoing solutions, the first reference pixels of the prediction pixels include any one of the following: a reconstructed pixel adjacent to the specified prediction unit, a pixel adjacent to the specified prediction unit and located on the upper left of the specified prediction unit, and a pixel selected from adjacent pixels of the prediction pixels according to an angular prediction mode used by the specified prediction unit; or the first pixel at an upper left corner of the specified prediction unit is used as the first reference pixel.

In some embodiments of the disclosure, based on the foregoing solutions, the selecting unit is configured to select the filters corresponding to the categories of prediction pixels from the filter parameter corresponding to the specified prediction unit in at least one manner of the following: selecting, based on a positive correlation relationship between a distance and a smoothing degree of a filter, the filters corresponding to the categories of prediction pixels from the filter parameter corresponding to the specified prediction unit; and selecting, based on a positive correlation relationship between a distance and a quantity of taps of a filter, the filters corresponding to the categories of prediction pixels from the filter parameter corresponding to the specified prediction unit In some embodiments of the disclosure, based on the foregoing solutions, the following parameters included in different filters are not identical: a smoothing strength, a quantity of taps, sub-pixel location precision, and filter coefficient precision.

In some embodiments of the disclosure, based on the foregoing solutions, the second processing unit 606 is further configured to encode, after obtaining the predicted value of the prediction pixel, the prediction pixel based on the predicted value of the prediction pixel; or decode the prediction pixel based on the predicted value of the prediction pixel.

Figure 7:
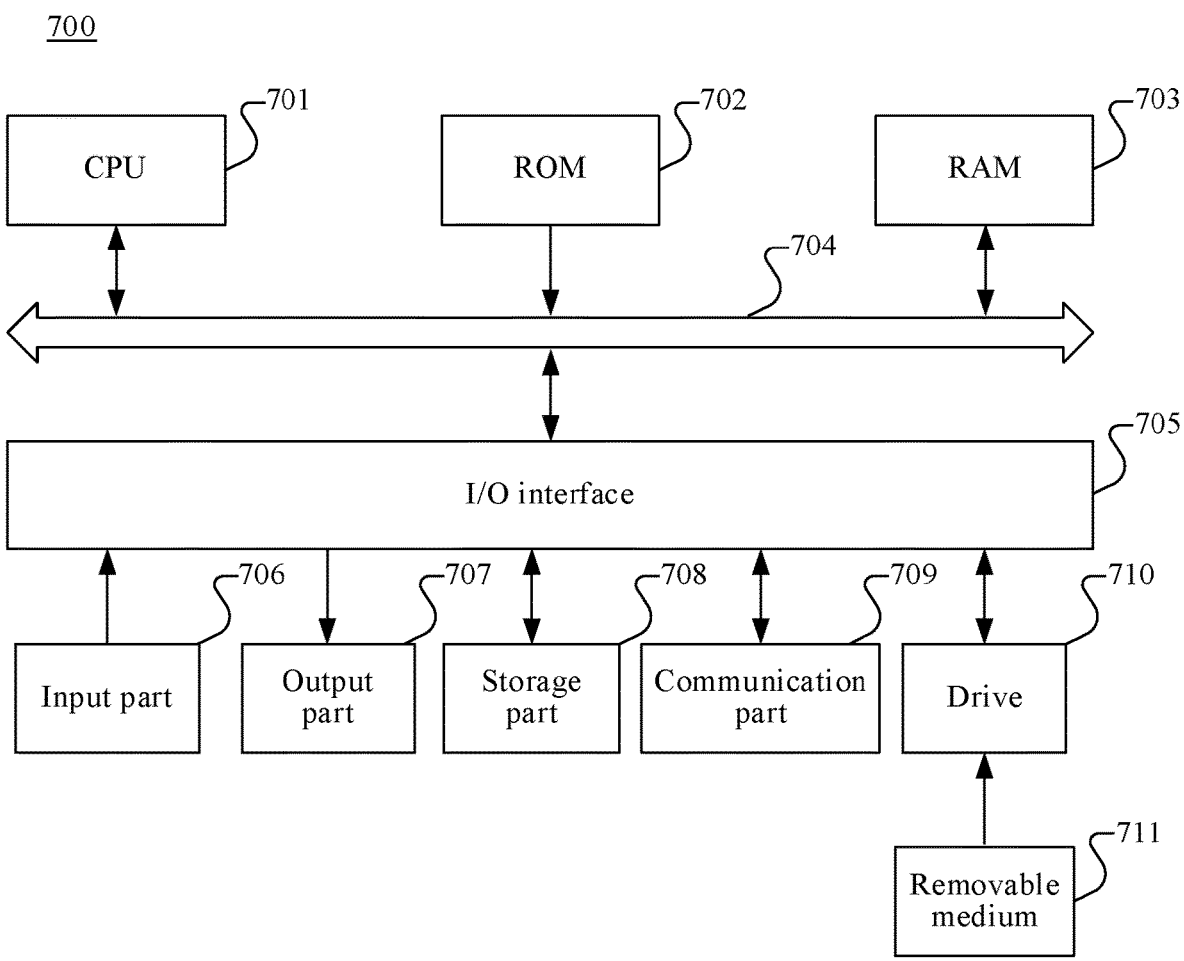
FIG. 7 is a schematic structural diagram of a computer system for implementing an electronic device according to an embodiment of the disclosure.

FIG. 7 is a schematic structural diagram of a computer system for implementing an electronic device according to an embodiment of the disclosure.

The computer system 700 of the electronic device shown in FIG. 7 is merely an example, and does not constitute any limitation on functions and use ranges of the embodiments of the disclosure.

As shown in FIG. 7, the computer system 700 includes a central processing unit (CPU) 701, which may perform categories of suitable actions and processing based on a program stored in a read-only memory (ROM) 702 or a program loaded from a storage part 708 into a random access memory (RAM) 703, for example, perform the method described in the foregoing embodiments. The RAM 703 further stores various programs and data required for system operations. The CPU 701, the ROM 702, and the RAM 703 are connected to each other through a bus 704. An input/output (I/O) interface 705 is also connected to the bus 704.

The following components are connected to the I/O interface 705: an input part 706 including a such as a keyboard, a mouse, or the like, an output part 707 including a cathode ray tube (CRT), a liquid crystal display (LCD), a speaker, or the like, a storage part 708 including a such as a hard disk, or the like, a communication part 709 including a network interface card such as a local area network (LAN) card or a modem. The communication part 709 performs communication processing over a network such as the Internet. A drive 710 is also connected to the I/O interface 705 as required. A removable medium 711, such as a disk, an optical disc, a magneto-optical disc, or a semiconductor memory, is installed on the drive 710 as required, so that a computer program read from the removable medium is installed in the storage part 708 as required.

According to an embodiment of the disclosure, the processes described by referring to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, the computer program may be downloaded and installed from the network through the communication part 709, and/or installed from the removable medium 711. When the computer program is executed by the CPU 701, the various functions defined in the system of the disclosure are executed.

The computer-readable medium shown in the embodiments of the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the embodiments of the disclosure, the computer-readable storage medium may be any tangible medium including or storing a program, and the program may be used by or in combination with an instruction execution system, apparatus or component. In this embodiment of the disclosure, the computer-readable signal medium may include a data signal transmitted in a baseband or as part of a carrier, and stores a computer-readable computer program. The propagated data signal may be in a plurality of forms, including but not limited to, an electromagnetic signal, an optical signal, or any appropriate combination thereof. The computer-readable signal medium may be any computer readable medium in addition to a computer-readable storage medium. The computer readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes in the drawings may alternatively occur in a sequence different from that annotated in the drawing. For example, two boxes shown in succession may be performed in parallel, or the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A related unit described in the embodiments of the disclosure may be implemented in a software manner, or may be implemented in a hardware manner, and the unit described may also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. According to the implementations of the disclosure, the features and functions of two or more modules or units described above may be specified in one module or unit. Conversely, features and functions of one module or unit described above may be further divided into a plurality of modules or units to be specified.

According to the foregoing descriptions of the implementations, a person skilled in the art would readily understand that the exemplary implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

In the technical solutions provided by example embodiments of the disclosure, according to a distance between a prediction pixel and a first reference pixel, a target filter matching the distance is selected from a filter parameter corresponding to a specified prediction unit, and interpolation filtering processing is performed on a second reference pixel by using the target filter, to obtain a predicted value of the prediction pixel. Accordingly, different interpolation filters may be adaptively selected according to location information of prediction pixels (that is, the distances between the prediction pixels and the first reference pixels), thereby improving the accuracy of pixel interpolation prediction during intra-frame prediction and improving the encoding compression performance and the decoding efficiency.

After considering the specification and practicing the disclosed embodiments, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the structures described above and shown in the accompanying drawings, and various modifications and changes may be made without departing from the scope of the disclosure. The scope of the disclosure is subject only to the appended claims.

What is claimed is:

1. An interpolation filtering method for intra-frame prediction, performed by a video decoding apparatus and/or a video encoding apparatus, the method comprising:
    classifying a plurality of prediction units included in a video frame into at least one category according to sizes of the plurality of prediction units, or intra-frame prediction modes used by the plurality of prediction units, or features of reference pixels adjacent to the plurality of prediction units;
    obtaining information about a prediction pixel included in a specified prediction unit of the plurality of prediction units;
    obtaining a filter parameter corresponding to the specified prediction unit;
    selecting, according to a distance between the prediction pixel and a first reference pixel of the prediction pixel, a target filter from the filter parameter corresponding to the specified prediction unit; and
    performing interpolation filtering processing on a second reference pixel of the prediction pixel by using the target filter, to obtain a predicted value of the prediction pixel,
    wherein the filter parameter corresponding to a category of the specified prediction unit comprises a filter bank $F=\{f_1, f_2, \ldots, f_{m+1}\}$ and at least one distance threshold $TD=\{td_1, td_2, \ldots, td_m\}$ (m being an integer equal to or greater than 1), the at least one distance threshold being used to classify each of prediction pixels included in the specified prediction unit based on a comparison between a distance between each prediction pixel and a corresponding first reference pixel against the at least one distance threshold, and filters $\{f_1, f_2, \ldots, f_{m+1}\}$ respectively apply to the classified prediction pixels that belong to each distance range obtained according to the at least one distance threshold, and
    wherein, when classification is performed according to the intra-frame prediction modes used by the plurality of prediction units, and independent of the sizes of the plurality of prediction units, at least one of the at least one distance threshold of a filter parameter that is predefined for classifying and obtaining each distance range of prediction pixels included in a first category of a prediction unit that is classified according to a first predetermined intra prediction mode is different from at least one of the at least one distance threshold of a filter parameter that is predefined for classifying and obtaining each distance range of prediction pixels included in a second category of a prediction unit that is classified according to a second predetermined intra prediction mode.

2. The interpolation filtering method according to claim 1, wherein the obtaining the filter parameter comprises:
    determining the filter parameter corresponding to the specified prediction unit according to a filter parameter corresponding to a category to which the specified prediction unit belongs.

3. The interpolation filtering method according to claim 1, wherein the classifying of the plurality of prediction units included in the video frame comprises classifying the plurality of prediction units included in the video frame into the at least one category according to the sizes of the plurality of prediction units included in the video frame, by:
    classifying the plurality of prediction units included in the video frame into a category corresponding to at least one set size range according to the sizes of the plurality of prediction units included in the video frame, a size of a prediction unit comprising any one of the following: a product of a width and a height of the prediction unit, a sum of the width and the height of the prediction unit, the width of the prediction unit, and the height of the prediction unit.

4. The interpolation filtering method according to claim 1, wherein the classifying of the plurality of prediction units included in the video frame comprises classifying the plurality of prediction units included in the video frame into the at least one category according to the features of the reference pixels adjacent to the plurality of prediction units included in the video frame, by performing:
    calculating, according to a plurality of reference pixels adjacent to the plurality of prediction units, a statistical feature of the plurality of reference pixels; and
    classifying the plurality of prediction units included in the video frame into the at least one category according to the statistical feature of the plurality of reference pixels.

5. The interpolation filtering method according to claim 4, wherein the plurality of reference pixels comprise at least one of the following: reference pixels located on a top of the plurality of prediction units in a pixel coordinate system and reference pixels located on a left of the plurality of prediction units in the pixel coordinate system; and
    the statistical feature of the plurality of reference pixels comprises any one of the following: a variance of gradient values of the plurality of reference pixels, a maximum gradient value in the plurality of reference pixels, an average gradient value of the plurality of reference pixels, a variance of pixel values of the plurality of reference pixels, and a difference between a maximum pixel value and a minimum pixel value in the plurality of reference pixels.

6. The interpolation filtering method according to claim 1, wherein the selecting comprises:
- calculating distances between prediction pixels included in the specified prediction unit and first reference pixels of the prediction pixels;
- classifying the prediction pixels included in the specified prediction unit according to the distances between the prediction pixels and the first reference pixels of the prediction pixels, to obtain at least one category of prediction pixels;
- selecting, according to the distances between categories of prediction pixels and the first reference pixels, filters corresponding to the categories of prediction pixels from the filter parameter corresponding to the specified prediction unit; and
- determining the target filter according to the filters corresponding to the categories of prediction pixels.

7. The interpolation filtering method according to claim 6, wherein the calculating the distances comprises any one of the following:
- calculating Euclidean distances between the prediction pixels and the first reference pixels of the prediction pixels, and using the Euclidean distances as the distances between the prediction pixels and the first reference pixels of the prediction pixels;
- calculating absolute values of abscissa differences between the prediction pixels and the first reference pixels of the prediction pixels and absolute values of ordinate differences between the prediction pixels and the first reference pixels of the prediction pixels, and using sums of the absolute values of the abscissa differences and the absolute values of the ordinate differences as the distances between the prediction pixels and the first reference pixels of the prediction pixels;
- calculating the absolute values of the abscissa differences of the prediction pixels and the first reference pixels of the prediction pixels and the absolute values of the ordinate differences of the prediction pixels and the first reference pixels of the prediction pixels, and using a minimum value or a maximum value in the absolute values of the abscissa differences and a minimum value or a maximum value in the absolute values of the ordinate differences as the distances between the prediction pixels and the first reference pixels of the prediction pixels;
- calculating the absolute values of the abscissa differences of the prediction pixels and the first reference pixels of the prediction pixels, and using the absolute values of the abscissa differences as the distances between the prediction pixels and the first reference pixels of the prediction pixels; and
- calculating the absolute values of the ordinate differences of the prediction pixels and the first reference pixels of the prediction pixels, and using the absolute values of the ordinate differences as the distances between the prediction pixels and the first reference pixels of the prediction pixels.

8. The interpolation filtering method according to claim 6, wherein
the first reference pixels of the prediction pixels comprise any one of the following: a reconstructed pixel adjacent to the specified prediction unit, a pixel adjacent to the specified prediction unit and located on the upper left of the specified prediction unit, and a pixel selected from adjacent pixels of the prediction pixels according to an angular prediction mode used by the specified prediction unit; or
a first pixel at an upper left corner of the specified prediction unit is used as the first reference pixel.

9. The interpolation filtering method according to claim 6, wherein the selecting the filters comprises at least one of the following:
- selecting, based on a positive correlation relationship between a distance and a smoothing degree of a filter, the filters corresponding to the categories of prediction pixels from the filter parameter corresponding to the specified prediction unit; and
- selecting, based on a positive correlation relationship between a distance and a quantity of taps of a filter, the filters corresponding to the categories of prediction pixels from the filter parameter corresponding to the specified prediction unit.

10. The interpolation filtering method according to claim 1, wherein at least one of the following parameters included in different filters are not identical: smoothing strength, a quantity of taps, sub-pixel location precision, and filtering coefficient precision.

11. The interpolation filtering method according to claim 1, further comprising:
- encoding the prediction pixel based on the predicted value of the prediction pixel; or
- decoding the prediction pixel based on the predicted value of the prediction pixel.

12. An interpolation filtering apparatus for intra-frame prediction, comprising:
- at least one memory configured to store program code; and
- at least one processor configured to read the program code and operate as instructed by the program code, the program code comprising:
  - obtaining code configured to cause the at least one processor to classify a plurality of prediction units included in a video frame into at least one category according to sizes of the plurality of prediction units, or intra-frame prediction modes used by the plurality of prediction units, or features of reference pixels adjacent to the plurality of prediction units;
  - and to cause the at least one processor to obtaining information about a prediction pixel included in a specified prediction unit of the plurality of prediction units;
  - and obtain a filter parameter corresponding to the specified prediction unit;
  - selecting code configured to cause the at least one processor to select, according to a distance between the prediction pixel and a first reference pixel of the prediction pixel, a target filter from the filter parameter corresponding to the specified prediction unit; and
  - processing code configured to cause the at least one processor to perform interpolation filtering processing on a second reference pixel of the prediction pixel by using the target filter, to obtain a predicted value of the prediction pixel,
  - wherein the filter parameter corresponding to a category of the specified prediction unit comprises a filter bank $F=\{f_1, f_2, \ldots, f_{m+1}\}$ and at least one distance threshold $TD=\{td_1, td_2, \ldots, td_m\}$ (m being an integer equal to or greater than 1), the at least one distance threshold being used to classify each of prediction pixels included in the specified prediction unit based on a comparison between a distance between each prediction pixel and a corresponding first reference pixel against the at least one distance threshold, and filters $\{f_1, f_2, \ldots, f_{m+1}\}$ respectively apply to the classified prediction pixels that belong to each distance range obtained according to the at least one distance threshold, and wherein, when classification is performed according to the intra-frame prediction modes used by the plurality of prediction units, and independent of the sizes of the plurality of prediction units, at least one of the at least one distance threshold of a filter parameter that is predefined for classifying and obtaining each distance range of prediction pixels included in a first category of a prediction unit that is classified according to a first predetermined intra prediction mode is different from at least one of the at least one distance threshold of a filter parameter that is predefined for classifying and obtaining each distance range of prediction pixels included in a second category of a prediction unit that is classified according to a second predetermined intra prediction mode.

13. The interpolation filtering apparatus according to claim 12, wherein the obtaining code is further configured to:

determine the filter parameter corresponding to the specified prediction unit according to a filter parameter corresponding to a category to which the specified prediction unit belongs.

14. The interpolation filtering apparatus according to claim 12, wherein the selecting code comprises:

calculating sub-code configured to cause the at least one processor to calculate distances between prediction pixels included in the specified prediction unit and first reference pixels of the prediction pixels;

classifying sub-code configured to cause the at least one processor to classify the prediction pixels included in the specified prediction unit according to the distances between the prediction pixels and the first reference pixels of the prediction pixels, to obtain at least one category of prediction pixels;

selecting sub-code configured to cause the at least one processor to select, according to the distances between categories of prediction pixels and the first reference pixels, filters corresponding to the categories of prediction pixels from the filter parameter corresponding to the specified prediction unit; and determining sub-code configured to cause the at least one processor to determine the target filter according to the filters corresponding to the categories of prediction pixels.

15. The interpolation filtering apparatus according to claim 12, wherein at least one of the following parameters included in different filters are not identical: smoothing strength, a quantity of taps, sub-pixel location precision, and filtering coefficient precision.

16. A non-transitory computer-readable medium, storing a computer program that is executable by at least one processor, to perform:

classifying a plurality of prediction units included in a video frame into at least one category according to sizes of the plurality of prediction units, or intra-frame prediction modes used by the plurality of prediction units, or features of reference pixels adjacent to the plurality of prediction units;

obtaining information about a prediction pixel included in a specified prediction unit of the plurality of prediction units;

obtaining a filter parameter corresponding to the specified prediction unit;

selecting, according to a distance between the prediction pixel and a first reference pixel of the prediction pixel, a target filter from the filter parameter corresponding to the specified prediction unit; and performing interpolation filtering processing on a second reference pixel of the prediction pixel by using the target filter, to obtain a predicted value of the prediction pixel, wherein the filter parameter corresponding to a category of the specified prediction unit comprises a filter bank $F=\{f_1, f_2, \ldots, f_{m+1}\}$ and at least one distance threshold $TD=\{td_1, td_2, \ldots, td_m\}$ (m being an integer equal to or greater than 1), the at least one distance threshold being used to classify each of prediction pixels included in the specified prediction unit based on a comparison between a distance between each prediction pixel and a corresponding first reference pixel against the at least one distance threshold, and filters $\{f_1, f_2, \ldots, f_{m+1}\}$ respectively apply to the classified prediction pixels that belong to each distance range obtained according to the at least one distance threshold, and wherein, when classification is performed according to the intra-frame prediction modes used by the plurality of prediction units, and independent of the sizes of the plurality of prediction units, at least one of the at least one distance threshold of a filter parameter that is predefined for classifying and obtaining each distance range of prediction pixels included in a first category of a prediction unit that is classified according to a first predetermined intra prediction mode is different from at least one of the at least one distance threshold of a filter parameter that is predefined for classifying and obtaining each distance range of prediction pixels included in a second category of a prediction unit that is classified according to a second predetermined intra prediction mode.

* * * * *